Nov. 29, 1932.  C. W. RICE  1,889,614
SOUND WAVE APPARATUS
Filed June 16, 1930
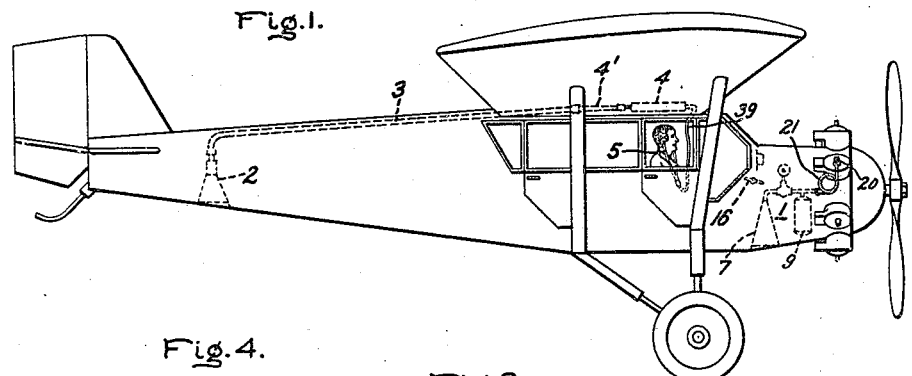
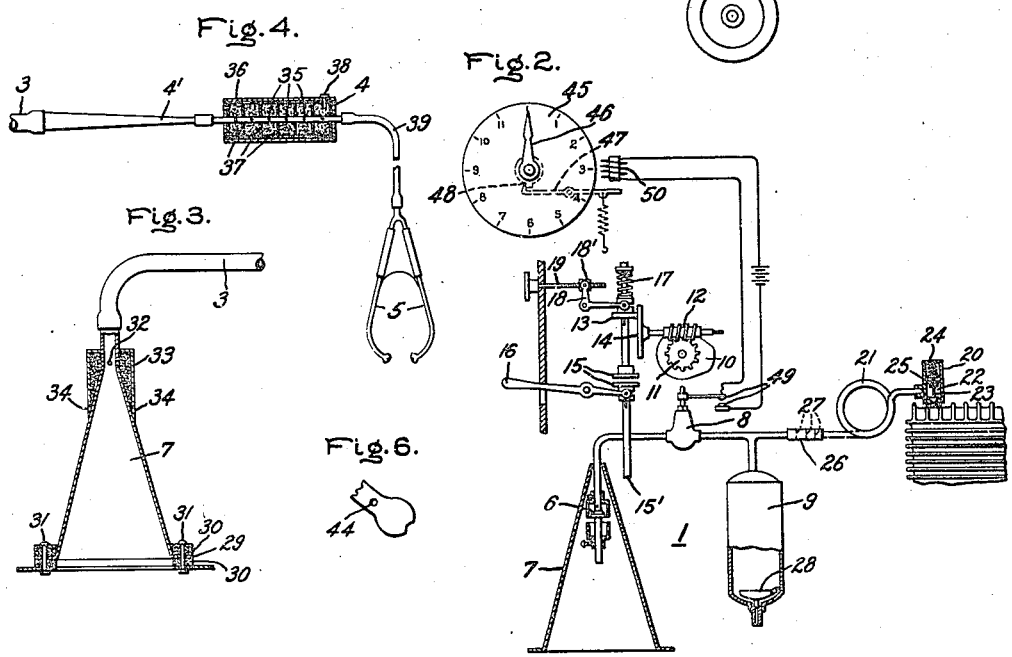
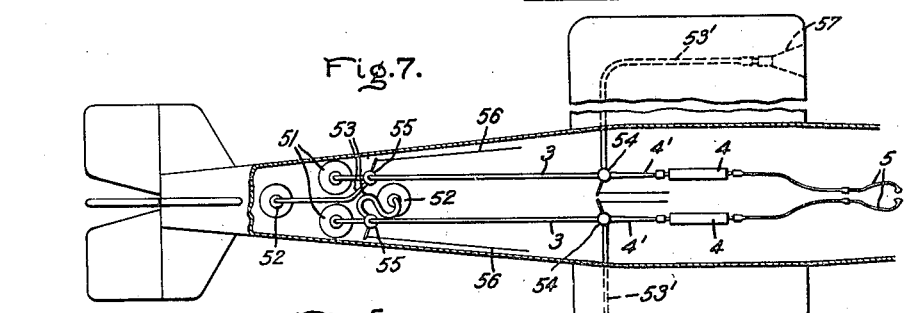
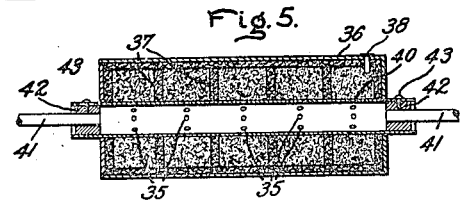
Inventor:
Chester W. Rice,
by Charles V. Tullar
His Attorney.

Patented Nov. 29, 1932

1,889,614

UNITED STATES PATENT OFFICE

CHESTER W. RICE, OF SCHENECTADY, NEW YORK, ASSIGNOR TO GENERAL ELECTRIC COMPANY, A CORPORATION OF NEW YORK

SOUND WAVE APPARATUS

Application filed June 16, 1930. Serial No. 461,620.

My invention relates to sound wave equipment. While it relates more particularly to sound wave equipment for aircraft and still more particularly to such equipment for use in determining the altitude of the craft above the earth, it, of course, is not limited thereto and may be employed generally for determining distances from reflecting surfaces by means of sound waves.

It has for one of its objects to provide an improved system employing sound waves for determining the altitude of the craft above the earth.

A further object of the invention is to provide a system of the type indicated which has the characteristic that its operation is particularly free from interference due to noises produced by the craft such as propeller and motor noises and the like. A further object of the invention is to provide a system in which the excessive pressures due to abrupt atmospheric variations about the craft are prevented from producing objectionable effects in the sound wave receiving equipment.

Still a further object of my invention is to provide a sound wave altitude indicating device for aircraft which may be arranged permanently upon the craft and carried thereby at all times and which is so constructed that its weight and space requirements are a minimum.

In connection with altitude indicating devices for aircraft it can be fairly generally stated that while they are valuable throughout the range of altitudes and at all times, their value is far greater at those times when due to the condition of the atmosphere the craft cannot be guided by sight and it is necessary that it be flown at the lower altitudes in search of a place where a landing can safely be made. Under such conditions a reliable altitude indicating device is of the greatest importance.

While the occasions when an aviator is forced to seek a landing place under conditions of extremely poor visibility are comparatively infrequent, it is of great importance that he be provided with a reliable altitude indicating device for use at those times. Accordingly it is desirable to provide upon the craft an altitude indicator which may be used at those times and of which the requirements, as to space and weight, are such as to permit its being permanently mounted upon the craft notwithstanding that the conditions under which the craft is operated do not require more than its very infrequent use, as in such instances of emergency. Accordingly, as indicated above, an object of my invention is to provide a satisfactory acoustic altitude indicating device in which the requirements with respect to space and weight are a minimum.

Another object of the invention is to provide such a device which is simple and rugged in construction and reliable in operation.

Still a further object of my invention is to provide such an acoustic altimeter in which a sustained tone or sound wave is employed as the means whereby indications are obtained, said tone having a pitch materially higher than the principal sounds of the craft, whereby in accordance with my invention, said sound waves may be efficiently selected from the extraneous sounds about the craft and supplied to an indicating device. This indicating device may, for example, be in the form of a stethoscope worn by the operator.

To produce the sustained tone employed in accordance with my invention a suitable high pitch pressure operated device such as a whistle, or siren, is employed and accordingly another object of my invention is to provide suitable means whereby pressure for operating the sound producing device may be produced and rendered continuously available notwithstanding the infrequent use of the device and without excessively burdening or encumbering the craft.

A further object of the invention is to provide means whereby sound impulses are emitted from the sound producing device periodically and whereby the period between impulses may be controlled as desired by the operator.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an aircraft provided with equipment in accordance with my invention; Fig. 2 represents the equipment comprising the sound transmitting mechanism; Figs. 3 and 4 represent the sound receiving means; Fig. 5 represents an acoustic filter which may be employed in connection with the receiving equipment; Fig. 6 represents a modification of the stethoscope shown in Fig. 4 and Fig. 7 represents a modification of the invention in which the binaural effect is employed.

Referring to Fig. 1 of the drawing, I have shown therein an aircraft on which is mounted a sound transmitting mechanism 1 and a sound receiver 2 which is connected through a suitable sound transmitting channel 3 including an acoustic filter 4 to a sound indicating device 5 which may be in the form of a stethoscope worn by the operator. This equipment is better illustrated in connection with Figs. 2, 3 and 4.

Referring to Fig. 2, I have shown a sound transmitter comprising a suitable pressure operated sound producing device which is shown in the form of a whistle 6, arranged within a suitable cone shaped sound director, or megaphone 7. Gas under pressure for operating the whistle is supplied thereto through a suitable valve 8 from a storage reservoir 9. Thus normally, gas is retained in the storage reservoir by means of the valve, whereas when the valve is opened, through means presently to be described, gas under pressure flows from the reservoir through the valve 8 to the whistle 6 causing sound of desired pitch to be produced. The valve 8 is arranged to be operated by means of a suitable cam 10 which is driven from the motor shaft through a suitable worm gear 11, worm 12, speed governing friction discs 13 and 14 and a friction clutch comprising a pair of discs 15, the lower disc of which is mounted upon a shaft 15' which is driven by the propelling motor. The clutch 15 is controlled from the cabin of the craft by means of a lever 16. Thus when the lever is operated downward by the operator, the two discs of the clutch 15 are pressed into engagement thereby causing rotation of the friction gears 13 and 14, worm 12, worm gear 11, and the cam 10. The rate of rotation of the cam 10 is governed by variation of the vertical position of the disc 13 upon the shaft upon which it is carried, thereby controlling its distance from the center of rotation of the disc 14. The disc 13 is biased downwardly by means of a spring 17 but may be retained in any position by means of a bell crank lever 18 one arm of which is secured to the disc 13 and the other arm of which is attached to a collar 18' which is threaded on to a rod 19 projecting through the panel of the operator's cabin. Thus by turning the rod 19 the rate of rotation of the cam 10 may be controlled.

To maintain gas in the reservoir 9 under pressure without unduly burdening the craft with special equipment, such as a gas compresser, or the like, I provide means whereby the gas under pressure is derived from one of the cylinders of the internal combustion engine which propels the craft. This may be effected by means of a suitable check valve 20 arranged in the head of one of the cylinders of the propelling engine and which is connected to the reservoir 9 through a flexible connection 21. This connection 21 extends to a chamber 22 within the valve 20 in which a pressure is maintained equal to the pressure in the tank 9. The valve comprises a valve member 23 which is biased downwardly by means of a spring 24 and the gas pressure within the chamber 22 to a position such that it closes the passage for gases from within the cylinder to the chamber 22. When pressure in the reservoir 9 becomes reduced through operation of the whistle 6, the member 23 is raised because of the reduced pressure in the chamber 22 and hot gases from the engine cylinder, during the firing stroke, pass therefrom into the chamber 22 and thence through the flexible connection 21 into the chamber 9.

These gases have approximately the temperature of the gases within the cylinder and of course may contain both gaseous fuel and products of combustion. Because of their high temperature it is necessary that the component parts of the valve 20 be constructed of metals capable of withstanding these temperatures without rapid deterioration. The hot gases are prevented from entering the compartment of the valve containing the spring 24 by means of a suitable collar 25 arranged to form the upper wall of the chamber 22 and about the member 23.

To prevent explosion of the gases within the reservoir 9 due to firing of the cylinder, I provide in the connection 21 a chamber 26 having suitable screens 27 arranged transversely thereof at spaced intervals, these screens being made of any suitable metal capable of efficiently withstanding the temperature of the gases. Of course the number of these screens employed and their spacing may be varied as desired. They offer little resistance to the flow of gases and liquid through the passage to the reservoir 9, but serve to extinguish the burning of gases and thereby prevent explosion of gases within the reservoir 9.

At the bottom of the reservoir 9 a suitable float valve 28 is provided, this valve being arranged to release from the reservoir any liquids which may accumulate therein, such for example as water which may be found in the products of combustion.

It will be seen that with the arrangement, as thus described, periodic sound impulses are produced by the whistle 6 and directed toward the ground by the deflector or megaphone 7. These impulses of course are of sustained tone and have a pitch determined by the whistle 6. For reasons which will later be indicated, this pitch is preferably in a range from 2000 to 4000 cycles.

The receiver 2 whereby the sounds reflected from the earth are again received upon the craft, is shown in greater detail in Fig. 3. This receiver likewise comprises a suitable cone shaped megaphone having an outwardly extending flange 29 at the lower portion thereof which is secured between two layers of felt 30 by means of bolts 31, these bolts being secured to a portion of the craft. By means of the layers of felt 30 the receiver is acoustically insulated from the frame of the craft. If desired the flange 29 may be flexibly attached to the craft, through any suitable means, not shown, such as a felt bellows thereby to permit inclining the cone as desired. The small, or vertex, portion of the cone 2 is provided with a number of openings 32 whereby high pressures within the cone, which are built up by sounds waves of low frequency, and by abrupt variations in air pressure due to changes in atmospheric pressure about the craft, as for example such as those which occur during rough weather, are released. Thus these high pressures are prevented from forcing air through the sound wave channel to the stethoscope, or other indicating device which may be employed. These openings provide a passage for air and sound waves of low frequency from the cone 2 into an outer cylindrical housing 33 which is likewise provided with vent holes 34. The space between the cylindrical housing 33 and the cone 2 is filled with a suitable damping material as for example felt and cotton waste. Thus this housing and its vent holes 34 provide a means for the escape of low frequency air pressures built up within the cone 2 and at the same time prevent extraneous noises about the craft from entering the sound wave channel.

The sound transmitting channel 3 of Fig. 1, which may comprise an aluminum pipe of fairly large diameter, with rubber connections, is fitted with the vertex portion of the cone 2, whereby sound waves are communicated from the cone 2 to the stethoscope 5 worn by the operator. Connected in this channel between the stethoscope and the pipe 3 is the acoustic filter 4 and a suitable reducing cone 4' best shown in Fig. 4.

The filter 4 comprises a small pipe of about 3/8 or 1/2 of an inch in diameter having disposed along the length thereof a number of openings 35, these openings being small bores in the wall of the pipe, whereby a plurality of series and shunt connected air passages are formed, causing the filter to offer a low shunt impedance to sound waves having the frequency of the principal sounds of the craft, such as for example those frequencies between 100 and 300 cycles and at the same time to offer a high shunt impedance to the passage of sound waves having the frequency of sound produced by the whistle 6. This filter is more particularly described in Patent No. 1,692,317 to G. W. Stewart, issued November 20, 1928.

A filter of construction similar to that indicated employing the openings 35 is particularly advantageous when employed in connection with my invention, not only because it serves to offer a high shunt impedance to a desired frequency and a low shunt impedance to undesired frequencies, but also because it prevents large amplitude low frequency sound waves from forcing their way through the passage comprising the filter 4 on into the stethoscope 6. These side openings also offer a further passage for the escape of air from the cone 2 when abrupt pressure increases occur due to atmospheric variations about the craft.

The filter 4 is preferably enclosed within a suitable acoustically damped housing 36, this housing being lined with felt, and divided into compartments by means of felt partitions 37, each compartment being arranged to receive sound through one of the openings 35. This compartment is, similarly with the compartment 33, vented at 38 thereby to permit the escape of air which enters the compartment through the openings 35. The compartments, between the partitions 37, are filled with suitable damping material such as cotton waste, the whole body comprising means whereby extraneous sounds about the cabin of the craft are prevented from entering the sound wave channel through the openings in the filter.

The reducing cone 4' which is connected between the large pipe 3 and the small pipe of the filter, is employed to provide a suitable impedance fit between the large listening line 3 and the smaller diameter filter passage. In those installations where a long receiving line 3 is required it should preferably be of at least one inch in diameter so as to offer low attenuation to the high frequency received waves.

The stethoscope may be connected directly by means of suitable flexible tubing 39 on to the end of the filter opposite to the cone 4'.

An acoustic filter of the type indicated in Fig. 4 may be classed as of the high-pass type since the higher frequencies pass through the filter without great attenuation, whereas low frequency waves are greatly attenuated.

In Fig. 5 I have shown a novel type of filter which may be employed, which possesses the same advantages as the above-described filter with respect to releasing from the sound wave channel large amplitude low frequency sound impulses and high dynamic pressures which result from atmospheric variations about the craft but which operates in a somewhat different way with respect to waves of the desired frequency. This filter comprises a hollow cylinder 40 having openings 35 arranged along the length thereof at regular intervals of one-half of a wave length of the sound waves which are to be efficiently transmitted through the channel. These openings are preferably disposed in groups about the circumference at the points at which pressure nodes in the desired wave occur. This cylinder may be of any suitable diameter, such for example as one inch. Sound waves are supplied to one end of the filter and transmitted from the opposite end through tubes 41 which are of about ¼ inch in diameter, these tubes being fitted in collars 42 which are themselves fitted for longitudinal adjustment within the ends of the cylinder 40.

The reducing cone 4' may be connected to one of these tubes 41 and the stethoscope may be connected to the opposite tube 41. The collars 42 are secured in position by means of screws 43 which extend through small longitudinal slots in the cylinder wall. Thus upon loosening the screws, the collars 42 may be moved longitudinally of the cylinder, thereby to provide a moderate tuning adjustment. The inner surface of the collars 42 should be spaced at a distance of a quarter of a wave length from the adjacent row of openings 35. As thus constructed the filter comprises a standing wave chamber in which the apertures 35 occur at the nodal points or points of zero pressure of the waves which it is desired efficiently to transmit. Thus these apertures, being spaced in accordance with the frequency of the whistle 6 will have little effect upon sound waves of this frequency which traverse the channel 3. The nodal points of waves of other frequencies, however, such as extraneous sounds about the craft, will not occur at the apertures 35, or at least very few of these nodal points will occur at the apertures 35, and accordingly, these apertures will be at points of greater or less pressure depending upon their positions in the cycle of the particular sound wave. Thus frequencies both above and below that of the frequency corresponding to the spacings of the apertures 35 will be attenuated. This filter, therefore, is in the nature of a band-pass filter as distinct from the high-pass filter of Fig. 4. The filter is enclosed within a felt lined housing 36 having an aperture 38 as described in connection with Fig. 4.

In Fig. 6 I have shown a modification of the stethoscope indicated in Fig. 4 whereby a further means is provided for protecting the ear of the operator from large low frequency sound pressure and high dynamic pressures built up in the sound wave channel due to atmospheric variations about the craft, this modification comprising a small aperture 44 in the stethoscope at a point adjacent to the ear, such that high pressures are released at this point. If desired the stethoscope may be so worn by the operator as to offer a slight opening between the ear and the ear piece of the stethoscope thereby to permit high pressures of low frequency to escape without affecting the ear.

As thus constructed the operation of the equipment will readily be apparent. The operator in desiring to determine his altitude will press the lever 16 downward, thereby causing the clutch discs 15 to engage each other and the cam 10 to be rotated, which in turn causes a succession of periodic sound wave impulses of high frequency to be transmitted. By listening at the stethoscope the operator may then ascertain the altitude by observing the time interval between the outgoing sound waves which are directly received by the receiver 2 and the waves which are received through reflection from the earth. It has been found that with a small amount of experience an operator in this way may readily determine the altitude down to a distance fairly close to the earth.

The arrangement of the transmitter and receiver upon the craft are such as to render the waves received directly from the transmitter readily distinguishable at the higher altitudes such for example as 1000 feet from those which are received through reflection by their difference in intensity. At the same time the transmitter and receiver are so arranged that the sound wave impulses which are received directly from the transmitter by the receiver are sufficiently attenuated to prevent their rendering the ears of the operator insensitive to waves received through reflection. Thus for example, if the wave received directly from the transmitter is of very high intensity, the ear of the operator is likely to be rendered sufficiently insensitive thereby, to prevent satisfactory detection of the sound waves received through reflection. For this reason, among others, the transmitting and receiving megaphones both have pronounced directive properties and are arranged upon the craft at a considerable distance apart. During a descent of the craft the waves received through reflection, of course, increase in intensity until at a certain altitude they have an intensity which is equal to that of the waves received directly, while at very low altitudes they may exceed in intensity the waves received directly from the transmitter. Thus the relative intensity of the waves received directly and those received through reflection furnish an additional indication of altitude. This indication is a valuable aid to the pilot particularly at the lower altitudes since it informs him definitely that he is at or below a certain previously known altitude level at which the two waves have substantially equal intensities. Of course at these lower altitudes the interval between the transmitted impulse and the resulting echo is sufficiently short as compared with that between any echo and the next transmitted impulse as to render further means for distinguishing between the two unnecessary.

If desired, any suitable mechanism such as a stop watch, may be employed accurately to determine the time interval between the transmitted and the received reflected waves. In the drawing I have shown an automatic mechanism whereby this result may be accomplished, this mechanism comprising an indicating device having a dial 45 and a cooperating pointer 46 which moves over the dial and which may be adapted to be driven by a suitable motor, or clock mechanism. The needle 46 is adapted to rotate in a clockwise direction but is held against rotation by means of a lever 47 the left hand end of which is adapted to engage a lug 48 which may be, if desired, made integral with the needle 46. The lever 47 is pivoted at its middle point while its right hand end is biased downwardly by means of a spring and is arranged to be attracted upwardly by means of a magnet 50. This magnet is connected in circuit with a pair of contacts 49 arranged upon the valve 8. Thus when the cam 10 is in position to open the valve 8, and thereby cause the transmission of a sound impulse, the contacts 49 are pressed into engagement thereby energizing the magnet 50 and releasing the needle 46. The needle 46 then rotates through a complete revolution and returns to the initial position where it is again stopped by means of the lever 47. The operator by observing the point upon the dial at which the sound wave due to reflection is received, may ascertain directly from the dial the altitude above the ground; that is, the dial may be calibrated in terms of altitude.

Preferably the mechanism whereby the needle 46 is rotated, is provided with a suitable governor, not shown, such as one of the centrifugal or magnetic drag type whereby the needle is caused to rotate at a uniform speed rather than in a step by step manner as would be the case were it driven through the escapement mechanism of a clock work without such a governor. It will, of course, be apparent that at the higher altitudes the time intervals between the sound wave impulses received directly from the transmitter and those received through reflection are longer than when the craft is in lower altitudes. Thus at these higher altitudes the impulses may be made less frequent by adjustment of the rod 19 thereby to allow for the greater interval between impulses. If desirable the timing mechanism may have two definite speeds and the dial 45 may have two scales, one for use in the higher altitudes, and the other for use in the lower altitudes.

The time interval required for a sound wave to travel from the craft to the ground and back may vary from roughly 1/100 of a second at an altitude of 5 feet, to two seconds, at an altitude of a thousand feet, and to proportionately greater intervals at higher altitudes. At 500 feet the period is in the order of one second, whereas at 50 feet of 1/10 of a second. These periods, together with the fact that the received sound must be readily distinguishable from extraneous noises about the craft, render the use of high frequency sound waves of great importance. Thus for example, each sound impulse should be of sufficient duration to give the sound a sustained and musical character. In this way the reflected wave is more readily distinguishable from noises about the craft than would be the case were impulses of shorter duration employed or were impulses employed of explosive nature such as the sound of a gun. To accomplish this, each impulse should have a duration of, in the neighborhood of 30 cycles. This means that if a frequency of 3000 cycles be employed, an impulse of 30 cycles would have a duration of 1/100 of a second, which corresponds to an altitude of 5 feet above the ground. Thus at that altitude the reflected wave would be received immediately at the termination of the transmitted impulse, whereas at greater altitudes an interval elapses between the termination of the transmitted impulse and the received reflected wave impulse. This means therefore that altitude indications may be made at very low altitudes, when this frequency is employed. On the other hand, were a frequency of 300 cycles employed the minimum duration of transmitted impulses to produce a good musical tone would be about 1/10 of a second, this period corresponding to a distance of 50 feet above the ground. Thus satisfactory operation of the system is limited to somewhat higher altitudes than in the former case. Thus it is readily apparent from this comparison that for satisfactory indications at the lower altitudes it is of importance that a higher frequency sound wave be employed.

On the other hand the sensitivity of the ear to sound waves of very high frequency is less than at frequencies in the range of that mentioned thus rendering excessively high frequencies undesirable; and further when very high frequencies are used turbulence about the craft and in the atmosphere may become troublesome by scattering the sound and reducing the intensity of the echo. I contemplate in connection with my invention the use of frequencies from 2000 to 4000 cycles as being most desirable.

A further advantage in the use of high frequencies in connection with my invention resides in the fact that sound waves of high frequency do not penetrate forests to the extent which is true of low frequency sound waves; in other words, very distinct echoes from near the tops of trees may be had when a high frequency sound wave is employed whereas this would not be the case were sound waves of low frequency employed.

The directing megaphones of the transmitter and receiver may also be made to have more pronounced directive properties to high frequency sound waves than is the case with low frequency sound waves and still be constructed with dimensions sufficiently small to avoid undesired encumberment of the craft. Thus the diameter of the base of each cone may be made of length equal to two or three times the wave length of the sound wave employed and to have a height of about two or three times this diameter.

My invention has been found to possess advantages in assisting the pilot to determine the angle of bank of his craft. For example, if the craft is purposely rolled from side to side, that is, as the angle of bank is varied first to one side and then to the other, the intensity of the echo becomes weaker on either side of the horizontal. That is, a maximum is obtained when the plane is flying horizontally. The pilot therefore may use the acoustic system as above described in controlling the lateral attitude of the craft. A similar effect has been noted in connection with the angle of ascent or descent of the craft.

These advantages of my invention may be augmented by the modification shown in Fig. 7 in which the binaural sense of the operator is utilized. In this figure I have shown at the rear portion of the craft two sound wave receivers 51 spaced apart laterally of the craft, each of these receivers being connected through a separate sound wave channel 3, reducing cone 4' and filter 4 to a binaural stethoscope 5 worn by the operator. In this way a more satisfactory determination of the angle of bank may be made. I have also shown in Fig. 7 an additional pair of sound wave receivers 52 spaced apart longitudinally of the craft or at right angles to the line extending through receivers 51. Both of these receivers are connected through pipes 53, which are of equal length, to a pair of three-way valves 55. These valves may be controlled from the cockpit of the craft by any suitable means, such for example as a pair of rods 56, which are connected thereto. By means of the valves 55 either pair of the receivers 51 or 52 may be connected with the receiving channels 3 and the binaural stethoscope 5.

I have also shown in Fig. 7 an additional receiver 57 mounted in the wing of the air craft and connected by means of a pipe 53' to a three-way valve 54 arranged in the sound wave channel at the entrance, or larger, end of the reducing cone 4'. If desired, one of these receivers may be used upon each wing, a three-way valve 54 being included in each of the sound wave channels. The purpose of these receivers is to provide a means whereby the pilot may determine when he is flying toward a cliff or the steep side of a mountain. By means of the three-way valves 54, the receivers at the rear of the craft may be disconnected and the wing receivers connected with the channel.

In this connection it may be pointed out that the transmitting megaphones as shown in Fig. 1, for example, may be advantageously mounted flexibly in order to permit of variation of their directivity with respect to the craft. In this way somewhat better indication may be had when the craft is flying in heavy winds and further, this adjustment is of value in connection with detecting the presence of abruptly rising surface below the craft.

Equipment as thus described will be seen to be such as to be readily mounted upon the craft without excessively encumbering or burdening the craft. The component parts of the transmitter and receiver, of course may be made of any light material such as aluminum and the reservoir need not be of large volume. By arranging the reservoir 9 and transmitting megaphone 7 near the propelling motor, long connections thereto are avoided and at the same time freezing of liquids within the reservoir is avoided, the heat from the engine being sufficient to maintain the reservoir above freezing temperature without the use of auxiliary heating appliance. The pressure within the reservoir 9 is always available, as for emergency use, and at the same time this equipment does not affect the operation of the engine cylinder. Further it does not withdraw gases from the cylinder except when in use.

While I have shown a particular embodiment of my invention, it will of course be understood that I do not wish to be limited thereto since many modifications in the arrangement of the system and in the instrumentalities employed may be made, and I therefore contemplate by the appended claims to cover any such modifications as fall within the true spirit and scope of my invention.

What I claim as new and desire to secure by Letters Patent of the United States, is,

1. The combination, in a system for determining altitude from aircraft, of means for producing sound waves having a predetermined frequency which is outside of the range of frequencies of the principal sounds produced by the craft, means for transmitting said sound waves of predetermined frequency toward the earth, a sound indicating device, a sound wave receiver upon the craft arranged to receive said sound waves after being reflected from the earth and to transmit said sound waves acoustically to said sound indicating device and means including an acoustic filter associated with said receiver to attenuate to a substantial degree sounds received by said receiver having frequencies corresponding to the frequencies of the principal sounds of the craft and at the same time to permit efficient transmission to said sound indicating device of sound waves having the frequency of said first means.

2. The combination, in an altitude indicating device for aircraft, of a sound wave transmitter and a sound wave receiver arranged upon the craft, said transmitter and receiver each having pronounced directive properties, and both said transmitter and receiver being directed toward the earth, a stethoscope adapted to be worn by the operator and arranged to be supplied with sound waves from the receiver, means for causing said sound wave transmitter to transmit sustained tone impulses of high pitch, said receiver being so arranged that sound waves from the transmitter are received by the receiver both directly and through reflection from the earth, the waves received directly having insufficient intensity to deafen the ear of the operator to reflected sound waves whereby the operator may determine from the interval between waves received in said stethoscope directly from said transmitter and waves received through reflection the altitude of the craft above the earth.

3. The combination, in an altitude indicating device for aircraft, of a transmitter of sound wave impulses and a sound wave receiver, said transmitter and receiver being so arranged upon the craft that at the higher altitudes sound waves are received by said receiver directly from the transmitter with greater intensity than sound waves received from the transmitter through reflection while at certain low altitudes sound waves received through reflection are of greater intensity than those received directly and at a certain altitude said waves are of equal intensity whereby both the relative intensity of said waves received directly and through reflection and the interval therebetween may be utilized to determine the altitude.

4. The combination, in an altitude indicating device for aircraft, of a stethoscope to be worn by the operator, means for transmitting from the craft a sustained audible tone having a pitch substantially higher than the pitch of the predominant sounds of the craft and means for selectively supplying to said stethoscope sound waves having said sustained audible tone and for excluding therefrom sound waves of frequency lower than said sustained audible tone.

5. The combination, in an altitude indicating device for aircraft, of means whereby an indication of received sound waves is obtained, means for transmitting from the craft toward the earth an audible sound having a pitch substantially higher than the principal sound of the craft, said first and second means having highly directive properties, said first means being responsive to the direct sound produced by said transmitting means and also to said sound as reflected from the earth, and means for substantially excluding from said first means the sound of the craft thereby substantially to prevent sounds produced by the craft from interfering with indications obtained through said first means.

6. The combination, in a system for determining altitude from aircraft, of a sound transmitter, and a sound receiver arranged upon the craft, said transmitter being arranged to transmit sound waves from the craft and said receiver being arranged to receive said sound waves after reflection from the earth, a sound indicating device associated with said receiver, means whereby said sound waves reflected from the earth are acoustically transmitted from the receiver to the indicating device and means for preventing the transmission from the receiver to the indicating device of sound waves of large amplitude and low frequency.

7. The combination, in an altitude indicating device for aircraft, of a sound transmitter, and a sound receiver arranged upon the craft, said transmitter being arranged to transmit sound waves from the craft and said receiver being arranged to receive said sound waves after reflection from the earth, a sound indicating device associated with said receiver and means for transmitting from the receiver to the indicating device sound waves reflected from the earth and for excluding from the indicating device abrupt pressure variations due to atmospheric changes about the craft.

8. The combination, in a sound wave system for aircraft, of a transmitter arranged to transmit sound waves of predetermined frequency different from the frequency of the principal sounds produced by the craft, a sound wave receiver, means whereby an indication of sound waves is obtained, a channel extending from said receiver to said means whereby sound waves received by said receiver are supplied through said channel to said means, and an acoustic filter included in said channel adapted efficiently to transmit sound waves having said predetermined frequency and materially to attenuate sound waves having the frequency of the principal sounds of the craft and means including said filter for releasing from the channel excessive increases in pressure due to abrupt atmospheric variations about the craft.

9. The combination, in a sound wave system for aircraft, of a transmitter arranged to transmit sound waves from the craft, a pair of sound wave receivers spaced apart on the craft and arranged to receive sound produced by the transmitter after being reflected from the earth, a pair of ear pieces adapted to be worn by the operator, and a sound wave channel extending from each receiver to one of said ear pieces whereby a binaural indication of incline of the craft with respect to earth is produced.

10. The combination, in sound wave system for aircraft, of a transmitter arranged to transmit sound waves from the craft, a plurality of receivers spaced apart upon the craft along different axes thereof and arranged to receive sound produced by the transmitter after being reflected from the earth, a binaural stethoscope and means whereby said stethoscope may be selectively connected with a plurality of said receivers arranged along any of said axes whereby the angle of incline of said craft along any of said axes may be determined.

11. The combination, in a sound wave system for aircraft, of a sound transmitter arranged to emit sound waves of predetermined frequency, a sound wave receiver on the craft arranged to respond to sound waves produced by said transmitter, a stethoscope, said receiver and stethoscope being arranged in a sound wave channel whereby sound waves received by said receiver are transmitted to said stethoscope, an opening in said channel whereby high pressures of low frequency are released and means to prevent extraneous sound waves about the craft from entering said channel through said opening.

12. The combination, in an altitude indicating device for aircraft, of a pressure operated sound wave producing device, means for supplying pressure thereto, means for controlling the pressure supply to said sound wave producing device, thereby to cause said device to produce periodic sound impulses, means on the craft for receiving said impulses after being reflected from the earth and means for changing the time interval between said impulses whereby different intervals may be produced at different altitudes.

13. The combination, on an aircraft, of a receiving megaphone, means whereby an indication of sound waves is obtained, and an acoustic channel between said megaphone and said means, said channel including a portion near said means of small cross-sectional area and having openings formed therein to constitute a filter selective to predetermined sound wave frequencies for which said megaphone is highly directive.

14. The combination, on an aircraft, of a receiving megaphone, means whereby an indication of sound waves is obtained, an acoustic channel between said megaphone and said means, said channel including a portion having openings formed therein to constitute a filter selective to predetermined sound wave frequencies, and means surrounding said portion to prevent extraneous sound waves produced about the craft from entering said channel through said openings.

15. The combination, on an aircraft, of a receiving megaphone, means whereby an indication of sound waves is obtained, and an acoustic channel between said megaphone and said means, said channel including a portion of small cross-sectional area and having openings formed therein to constitute a filter selective to predetermined sound wave frequencies for which said megaphone is highly directive, the major portion of said channel being of large cross-sectional area, and a tapered channel unit between said filter portion and said major portion of said channel to form an acoustic impedance fit between said channel portions.

16. The combination, in a system for determining altitude from aircraft, of a transmitting megaphone, a receiving megaphone, said megaphones having highly directive properties at high frequencies, and said megaphones being spaced apart upon the craft and directed toward the earth, means whereby an indication of sound waves received in said receiving megaphone is obtained, and an acoustic channel between said last means and said receiving megaphone, said channel comprising a filter to attenuate air waves of low frequencies and to offer low impedance to air waves of high frequency.

17. The combination, in a system for determining altitude from aircraft, of a transmitting megaphone, a receiving megaphone, said megaphones having highly directive properties at high frequencies, and said megaphones being spaced apart upon the craft and directed toward the earth, means whereby an indication of sound waves received in said receiving megaphone is obtained, and an acoustic channel between said last means and said receiving megaphone, said channel comprising a filter to attenuate air waves of low frequencies and to offer low impedance to air waves of high frequency, and means for producing in said transmitting megaphone sound wave impulses, each of said impulses being of sufficient duration to have a sustained musical character and the frequency of said sound waves being sufficiently high that said duration of the impulses is not greater than the time required for a wave to travel from the craft to the earth and back at the lower altitudes to be measured during the landing operation of the craft.

18. In an altitude determining system for aircraft, the combination of a transmitting megaphone, a receiving megaphone, said megaphones being arranged on the craft and directed toward the earth, a source of sound waves in said transmitting megaphone having a frequency substantially higher than the principal sounds produced by the craft, said megaphones having a base diameter of at least twice the length of said sound waves and a length equal to at least twice said base diameter, and means connected with said receiving megaphone whereby an indication of sound waves received therein is obtained.

19. The combination, in a system for detecting the proximity of distant sound reflecting surfaces from moving craft, of a directional sound wave transmitter carried by said craft, a directive sound wave receiver arranged to receive sound waves from said transmitter after reflection from a distant object, said receiver being subjected to extraneous sound waves produced about the craft, the waves transmitted from said transmitter having a frequency materially higher than the frequency of the principal extraneous sounds produced in said receiver, a sound wave indicating device, and means efficiently to transmit from said receiver to said indicating device sound waves having the frequency of waves transmitted by said transmitter and substantially to attenuate extraneous sounds produced about the craft.

20. The combination, in an air wave apparatus, of a transmitting megaphone, a receiving megaphone, a source of air waves in said transmitting megaphone arranged to emit air waves having a wave length short as compared with the length and base dimensions of said megaphones, said receiving megaphone being arranged to receive air waves from said transmitting megaphone after reflection from a distant air wave reflecting surface, and means for indicating the reception of air waves received in said receiver.

21. The combination, in a sound wave apparatus, of means for transmitting a beam of air wave impulses, each of said impulses comprising air waves of a sustained high pitch, a directive air wave receiver arranged to receive said air waves from said transmitter both directly and after reflection from a distant surface, an air wave indicating device, means interposed between said air wave receiver and said air wave indicating device to render said indicating device selectively responsive to air waves of said high pitch whereby the position of a distant object may be determined from the time interval elapsing between response of said indicating device to air waves received from the transmitter directly and air waves received from the transmitter after reflection from said distant object.

22. The combination, in a system for detecting the proximity of distant sound reflecting surfaces from moving craft, of a directional sound wave transmitter carried by said craft, a directive sound wave receiver arranged to receive sound waves from said transmitter after reflection from a distant object, said receiver being subjected to extraneous sound waves produced about the craft, the waves transmitted from said transmitter having a frequency materially higher than the frequency of the principal extraneous sounds produced in said receiver, a sound wave indicating device, and means including an acoustic filter arranged efficiently to transmit from said receiver to said indicating device sound waves having the frequency of waves transmitted by said transmitter and substantially to attenuate extraneous sounds produced about the craft, and a shield about said filter to prevent the entrance therethrough of extraneous sounds produced about the craft.

23. The combination, in a sound echo apparatus, of a directive transmitter of sound wave impulses, a directive sound wave receiver, said sound wave receiver being arranged to receive sound waves from said transmitter both directly and after reflection from a distant surface, said waves received directly being of greater intensity than waves received due to reflection from a distant surface whereby said waves received directly are readily distinguishable from waves received through reflection from a distant surface, and the distance to said surface may be determined by the interval between reception in said receiver of an impulse received directly from the transmitter and the same impulse received through reflection from said surface.

24. The combination, in an air wave echo apparatus, of a directive air wave transmitter, a directive air wave receiver, means for causing said transmitter to transmit air wave impulses, each impulse comprising air waves having a frequency of from 2000 to 4000 cycles per second, said air wave receiver being arranged to receive said impulses after reflection from a distant surface, and means whereby the interval between the transmission of an impulse by said transmitter and reception thereof in said receiver after reflection from a distant surface may be determined.

25. The combination, in a sound wave echo apparatus, of a transmitting megaphone, a receiving megaphone, both said transmitting megaphone and said receiving megaphone being directed in the same direction, a high pitch whistle in said transmitting megaphone, means to supply gas under pressure for operation of said whistle whereby a beam of sound waves of high pitch are transmitted from said transmitting megaphone and are received in said receiving megaphone after reflection from a distant surface, and means arranged selectively to respond to said sound waves of high pitch received in said receiving megaphone from said whistle after reflection from a distant object.

26. In combination, a directive air wave transmitter, a directive air wave receiver, said transmitter being arranged to transmit air waves having a frequency greater than two thousand cycles and said receiver being arranged selectively to respond to the frequency transmitted by said transmitter.

27. In combination, a directive air wave transmitter, a directive air wave receiver, said transmitter being arranged to transmit air waves having a frequency greater than two thousand cycles and said receiver being arranged to receive waves produced by said transmitter, a sound wave indicating device associated with said receiver and an acoustic filter arranged efficiently to transmit sound waves received from said transmitter in said receiver to said indicating device and to attenuate lower frequencies.

In witness whereof, I have hereunto set my hand this 13th day of June, 1930.

CHESTER W. RICE.